US012554676B1

United States Patent
Kammara et al.

(10) Patent No.: US 12,554,676 B1
(45) Date of Patent: Feb. 17, 2026

(54) ROBUST METHODS FOR AUTOMATED MANAGEMENT OF DISTRIBUTED SYSTEMS

(71) Applicant: Citibank, N.A., New York, NY (US)

(72) Inventors: Raja Shekher Kammara, Chennai (IN); Jose Javier Castanon de la Vega, Irving, TX (US); Pranita Santosh Patil, Irving, TX (US); Ravi Padarthi, Irving, TX (US); Richard Eric Lawton, Irving, TX (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 19/078,243

(22) Filed: Mar. 12, 2025

(51) Int. Cl.
G06F 16/00 (2019.01)
G06F 16/11 (2019.01)
G06F 16/182 (2019.01)

(52) U.S. Cl.
CPC ............ G06F 16/11 (2019.01); G06F 16/182 (2019.01)

(58) Field of Classification Search
None
See application file for complete search history.

(56) References Cited

U.S. PATENT DOCUMENTS

| | | | |
|---|---|---|---|
| 8,588,749 B1 * | 11/2013 | Sadhvani | H04M 1/725 455/418 |
| 2023/0283521 A1 * | 9/2023 | Berger | H04L 63/20 709/223 |
| 2025/0138924 A1 * | 5/2025 | Gonsalves | G06F 9/548 |

* cited by examiner

Primary Examiner — Alex Gofman
Assistant Examiner — Suman Rajaputra
(74) Attorney, Agent, or Firm — Perkins Coie LLP

(57) ABSTRACT

Systems and methods are disclosed comprising instructions to receive a snapshot of data artifacts corresponding to a user of a plurality of runtime applications prior to upload at a remote database, access an assigned set of constraint parameters that defines acceptable content elements of data artifacts, determine a first set of non-compliant content elements of each data artifact that fail to satisfy a first subset of the set of constraint parameters, determine a second set of non-compliant content elements of each data artifact that fail to satisfy a second subset of the set of constraint parameters, generate a content sensitivity score indicating management risk for each data artifact, identify a set of critical data artifacts corresponding to content sensitivity scores that fail to satisfy a risk tolerance threshold, and transmit a notification alert to the user indicating content review of at least one identified critical data artifact from the snapshot.

20 Claims, 8 Drawing Sheets

ROBUST METHODS FOR AUTOMATED MANAGEMENT OF DISTRIBUTED SYSTEMS

BACKGROUND

In data management and information systems, an information silo refers to an isolated management system where one information system or subsystem is incapable of reciprocal operation with others that are, or should be, related. This isolation results in information being inadequately shared and remaining confined within each system or subsystem with no impact beyond those limited boundaries. Information silos present significant challenges for complex interconnected computing systems, particularly those aiming to leverage analytical techniques to extract valuable insights from information consolidated from multiple data sources. Thus, the inability to integrate and share data across systems hinders the overall productivity and efficiency of data utilization. The occurrence of information silos can be attributed to several factors, including incompatibilities in technical architecture, application architecture, and data architecture that prevent seamless integration and communication between different data systems.

BRIEF DESCRIPTION OF THE DRAWINGS

Detailed descriptions of implementations of the present invention will be described and explained through the use of the accompanying drawings.

Figure 1:
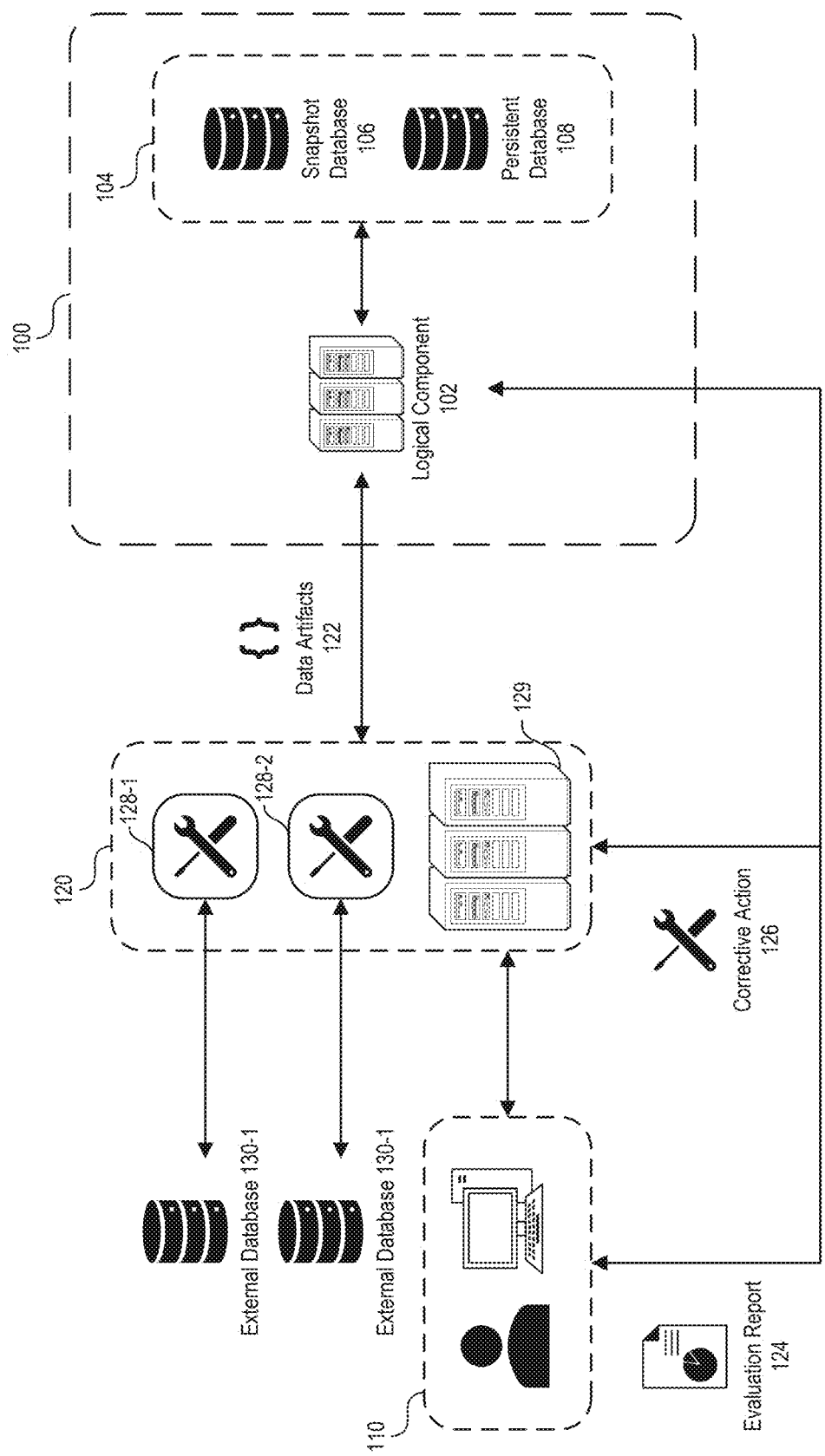
FIG. 1 is a block diagram showing an illustration of a unified data management system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Distributed systems typically rely on several software applications and data sources (e.g. databases, files, and/or the like). End users of these distributed systems commonly interact with one or more system features (e.g. data management system, a file management system, and/or the like) that enable storage and/or distribution of potential restricted data (e.g., privileged information, confidential data, and/or the like), which often requires additional evaluation processes to ensure data compliance (e.g., data usage restrictions). However, distributed systems generally employ custom and/or unique data management systems (e.g., data storage structures, data handling protocols, and/or the like) that are often incompatible or isolated from one another, resulting in fragmentation of user data artifacts (e.g., data silos).

One of the challenges to identify data compliance across distributed systems that process the information by sending information from one system to another requires addressing several unknowns in conventional approaches to assessing data compliance for an assembly of independent (e.g., architectural incompatibility) computing services, such as how to access application data in a standardized format. Existing systems infrastructure deploys a suite of automation solutions (e.g., executable software programs) that perform custom (e.g., non-modular) processes that evaluate data compliance for a dedicated application and/or service. As architecture grows increasingly complex over time (e.g., addition of new services, updates to data compliance restrictions, and/or the like), comprehensive assessment of data compliance for dependent services via custom automation solutions rapidly becomes intractable. To further compound this issue, conventional data management systems are unable to perform evaluation of user data compliance due to exceptional challenges associated with fragmentation of user data artifacts (e.g., structured application data) across several independent application services. As a result, these conventional systems depend on retroactive solutions to address data compliance errors long after their initial occurrence, providing ample time to incur significant damages that diminish the overall user experience, place undue burden on maintenance support teams, negatively impact third-party services, and so forth. Thus, there is an evident need for a streamlined solution that enables end users to proactively manage data artifacts corresponding to independent application services and associated data management systems.

Disclosed herein are systems and related methods for identification, integration and management of data artifacts (e.g., structured and unstructured data, alphanumeric text, document files, source code, and/or the like) associated with user activities (e.g., communications, documentation, authoring, decision-making process and/or the like) originating from an assembly of accessible applications and/or runtime services (e.g., management system, a file management system, and/or the like). The disclosed system identifies non-compliant elements (e.g., ineligible content) of critical user data artifacts that are incompatible with one or more assigned constraint parameters (e.g., data content restrictions) prior to updating a database for the assembly of applications. By automatically tracking critical user data artifacts, the disclosed system enables users (e.g., participant users, maintenance staff, and/or the like) to proactively resolve data compliance issues (e.g., sensitive personal data, proprietary information, security clearances, and/or the like) associated with usage of the assembly of workflow applications.

In some implementations, the system can identify a set of critical (e.g., non-compliant, high-risk records) data artifacts corresponding to a specified user/system. As an example, the system can capture a temporary snapshot (e.g., stored in a secure in-memory data structure) of user data artifacts prior to updating a unified (e.g., shared) database for an assembly of runtime applications. From the temporary snapshot, the system can identify non-compliant elements of the user data artifacts that fail to satisfy a set of constraint parameters (e.g., data content restrictions) associated with the user and/or usage of the application services. Using the identified non-compliant elements, the system can generate sensitivity scores that indicate an approximate management risk (e.g., accessibility permissions, regulatory consequences, and/or the like) associated with handling the user data artifacts from the snapshot. Accordingly, the system can identify, and report, critical data artifacts with sensitivity scores that exceed an acceptable tolerance threshold to users for further maintenance and review.

Advantages of the disclosed system include a standardized compliance evaluation process that identifies critical/potential user data artifacts from a plurality of dependent/independent applications and/or services within a unified analytical framework (e.g., via combined data representation). As a result, the system presents a streamlined method for performing comprehensive data compliance analysis of distributed system. Furthermore, the disclosed technology assists external users (e.g., data analysts, system administrators, or regulatory compliance officers and/or the like) in automatically, or semi-automatically, resolving non-compliant data artifacts prior to any significant action (e.g., synching to a cloud-based analytics platform or submitting data to an enterprise-grade content management system) with potential for negative downstream consequences (e.g., exposure of sensitive information, breach of data handling regulations, and/or the like).

For illustrative purposes, examples are described herein in the context of proactive identification and management of critical user data artifacts originating from a plurality of user accessible applications and/or runtime services. However, a person skilled in the art will appreciate that the disclosed system can be applied in other contexts. For example, the disclosed system can be used within cybersecurity systems to streamline detection, and mitigation, of anomalous (e.g., non-compliant) and/or potentially malicious software execution.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

FIG. 1 is a block diagram showing an illustration of a unified data management system 100 ("system 100") that can implement aspects of the present technology. The system 100 can comprise a logical component 102 that is configured to monitor, and evaluate, user data artifacts 122 retrieved from a runtime application assembly 120 (e.g., a collection of computing services). As an example, the system 100 can generate an evaluation report 124 that enables users 110 to review non-compliant content elements of data artifacts 122 that fail to satisfy one or more constraint parameters (e.g., data usage restrictions). The system 100 can communicatively couple the logical component 102 to interfacing user devices of an end user 110 to present evaluation reports 124. The system 100 can communicatively couple the logical component 102 to the runtime application assembly 120 to deploy corrective actions 126 to resolve the non-compliant elements of the identified data artifact 122. The logical component 102 of system 100 can be one or more of: a data model, a machine learning model, a computer program, or other logical components configured for receiving and/or analyzing user data artifacts 122—and/or processing—related data.

The system 100 can further comprise a unified data framework 104 (e.g., similar to example databases 515 and 525 of FIG. 4) that is configured to receive, and store, user data artifacts 122 captured from the runtime application assembly 120. In particular, the logical component 102 can communicatively couple to the unified data framework 104 to access and/or store user data artifacts 122. In some implementations, the unified data framework 104 can extract data from external, and often isolated, databases 130 (e.g., via an API, a remote access, direct connection, and/or the like) that correspond to individual runtime applications of the assembly 120. In other implementations, the logical component 102 can configure the unified data framework 104 to comprise multiple data storage partitions for managing user data artifacts 122. For example, the unified data framework 104 can comprise a temporary snapshot database 106 that receives immediate data artifacts 122 from the runtime application assembly 120 prior to submission to a persistent database 108. As a result, the logical component 102 can use the multiple partitions of the unified data framework 104 to manage data artifacts 122 in a modular format.

The system 100 monitors user 110 activities (e.g., via background listening processes) within the runtime application assembly 120 (e.g., communication messages, document upload, audio recording, and/or the like) that result in generation, distribution, and/or storage of potentially sensitive information (e.g., privileged and/or confidential data) across user accessible applications 128 and/or computing services. In some implementations, the system 100 can monitor activities of self-executing computing systems 129 (e.g., automated software programs) that connect (e.g., via an API) to one or more runtime applications of the assembly 120 for managing data. In other implementations, users 110 can include authorized entities (e.g., privileged users, maintenance staff members, and/or the like) that review and/or manage data usage for the runtime application assembly 120 via the system 100. For example, authorized entities can include privileged users, maintenance staff members, regulatory bodies, and/or other users with elevated credentials to define constraint parameters that limit data usage for the runtime application assembly 120.

A runtime application (e.g., or computing service) of the assembly 120 corresponds to user-interactive 128 (e.g., or self-executing 129) software utilities (e.g., enterprise services, productivity tools, automated programs, and/or the like) that enable users 110 to perform one or more specified functions (e.g., send a message, create a document, execute a program, and/or the like). As shown in FIG. 1, individual runtime applications can combine with other related runtime applications to form an assembly 120 of runtime applications often found within large and/or complex work management systems. In some examples, each individual runtime application can be communicatively coupled to a custom external database 130 for accessing and/or storing data structures unique to the application. In other examples, the assembly 120 can comprise of first-party applications that are part of a recognized work management system. In alternative examples, the assembly 120 can comprise of independent third-party applications that are combined into a single operational unit. In further examples, the assembly 120 can comprise of compatible third-party applications that are part of a uniform ecosystem (e.g., Microsoft Office 365, Google Docs Editors, and/or the like). The logical component 102 can access runtime applications of the assembly 120 via direct or remote communication channels (e.g., remote SSH, an API, and/or the like).

The logical component 102 can extract application data (e.g., an alphanumeric text, a document file, an image, a video, an audio signal, an activity log, an embedded reference to external data, a source code, a persistent memory state, a data communication request, and/or the like) associated with user activities in the form of data artifacts 122. In particular, the logical component 102 can monitor, and store, user application data within a standardized data structure format to store information from multiple independent applications within a unified data database. The logical component 102 can restructure and/or transform unprocessed data extracted directly from a runtime application into a uniform structure that comprises the data payload, a set of trace characteristics (e.g., contextual metadata, identifiable information), a user activity log, and/or the like. For example, the logical component 102 can monitor a user submission of communication data (e.g., an text message) to extract the data payload (e.g., the alphanumeric text) and trace characteristics (e.g., author, destination, source, timestamp, and/or the like) to form a composite standardized data structure, or data artifact 122 (e.g., a JSON object, a compressed file, symbolic links to stored files, and/or the like). In another example, the logical component 102 can monitor an endpoint submission of a communications request via an API to a server (e.g., or client) to extract the data payload (e.g., unprocessed data packets) and trace characteristics (e.g., request itself) to form a standardized data artifact 122.

The logical component 102 can determine content compliance of user data artifacts 122 that are captured from the runtime application assembly 120. For example, the logical component 101 can use assigned constraint parameters (e.g., predefined data usage requirements and/or restrictions to identify non-compliant elements within the received data artifacts 122. In some implementations, the logical component 102 can further identify, and isolate, critical data artifacts 122 that correspond to an anomalous frequency of non-compliant elements for user 110 review. In additional or alternative implementations, the logical component 102 can evaluate compliance of user data artifacts 122 at a temporary snapshot database 106 (e.g., an isolated memory cache) prior to upload to a persistent database 108. As a result, the logical component 102 can easily separate and store compliant data artifacts 122 with minimal non-compliant elements onto the persistent database 108.

The logical component 102 can generate an evaluation report 124 that notifies users 110 (e.g., authorized users, maintenance staff, and/or the like) of detailed information pertaining to identified critical data artifacts. For example, the logical component 102 can configure the evaluation report 124 to include trace characteristics (e.g., a user identification number, source runtime application, infringed constraint parameters, a stored location, and/or the like) that enable users 110 to directly track and/or manage the identified critical data artifacts. In some implementations, the logical component 102 can configure the evaluation report 124 to include recommended remediation strategies for resolving the identified critical data artifacts. For example, the logical component 102 can use a generative machine learning model (e.g., a large language model) to create human-readable narratives that detail procedural instructions for reviewing and/or updating the critical data artifacts. The logical component 102 can transmit the generated evaluation report 124 to users 110 via an established communication channel (e.g., an email message, a text message service, a web-portal API, and/or the like). In some implementations the logical component 102 can further configure the evaluation report 124 (e.g., prior to transmission) to display contents of the evaluation report 124 (e.g., trace characteristics, remediation strategies, and/or the like) via user interface elements (e.g., user interface widgets, visual images, and/or the like). The logical component 102 can further configure the evaluation report 124 to display interactive user interface elements that enable users 110 to transmit actionable information to the logical component 102. For example, the logical component 102 can configure the evaluation report 124 to provide users 110 with one or more selectable options (e.g., via interactive elements that, when selected, requests the logical component 102 to execute a corrective action 126 (e.g., modifying contents of critical data artifacts, initiating evaluation model training, and/or the like).

In some implementations, the logical component 102 can be configured to manage constraint parameters (e.g., acceptable content types, data usage restrictions, and/or the like) used to evaluate compliance (e.g., sensitive data risk mitigation) of user data artifacts 122 from the runtime application assembly 120. For example, the logical component 102 can receive (e.g., from an authorized user) a structured ruleset that defines acceptable and/or non-acceptable content elements for monitored data artifacts 122. In some implementations, the constraint parameters can comprise information or data types pertaining to protected information (e.g., confidential data, identifiable user information, and/or the like), prohibited content (e.g., inappropriate content, profanity, and/or the like), a user specific content restriction (e.g., an custom content restriction), a data usage restriction (e.g., access or distribution restrictions), and/or a third-party regulatory restriction. In additional or alternative implementations, the logical component 102 can be configured to update the stored constraint parameters. For example, the logical component 102 can receive (e.g., via a connected user interface) an authorized request (e.g., from a privileged user, a regulatory organization, a governing entity, and/or the like) to modify (e.g., addition, removal, reconfigure, and/or the like) a stored set of constraint parameters used for determining non-compliant elements of user data artifacts. In some implementations, the logical component 102 can be configured to apply separate subsets of constraint parameters for evaluating user data artifacts 122 originating from different runtime applications of the assembly 120. In other implementations, the logical component 102 can be configured to apply separate subsets of constraint parameters for evaluating data artifacts 122 that correspond to a specified user 110 identity (e.g., an associated user profile, a user identifier, and/or the like).

In some implementations, the logical component 102 can be configured to perform compliance evaluation (e.g., or additional corrective actions) of monitored user data artifacts on a periodic frequency, such as once per day, once per hour, or another predefined time interval. In additional or alternative implementations, the logical component 102 can be configured to perform the compliance evaluation of monitored user data artifacts in near real-time (e.g., or within a responsive time interval) via decrementing the periodic frequency. In other implementations, the logical component 102 can be configured to dynamically adjust the periodic frequency based on the identified critical data artifacts for a particular user or runtime application. For example, the logical component 102 can compare a first incidence measure (e.g., identification rate, risk severity scores, and/or the like) for critical data artifacts from a latest timestamp (e.g., at time of performing latest compliance evaluation) to a second incidence measure of critical data artifacts from a prior timestamp (e.g., at time of performing prior compliance evaluation) to determine an approximate incidence divergence score that indicates a temporal deviation in measured attributes (e.g., assessed management risk) of critical data artifacts. In response to the incidence divergence score exceeding (e.g., or failing to satisfy) an equilibrium threshold, the logical component 102 can adjust (e.g., increment, decrement) the periodic frequency by a corrective factor (e.g., a numeric multiple) that scales with the magnitude of the incidence divergence score.

Unified Data Management System

Figure 2:
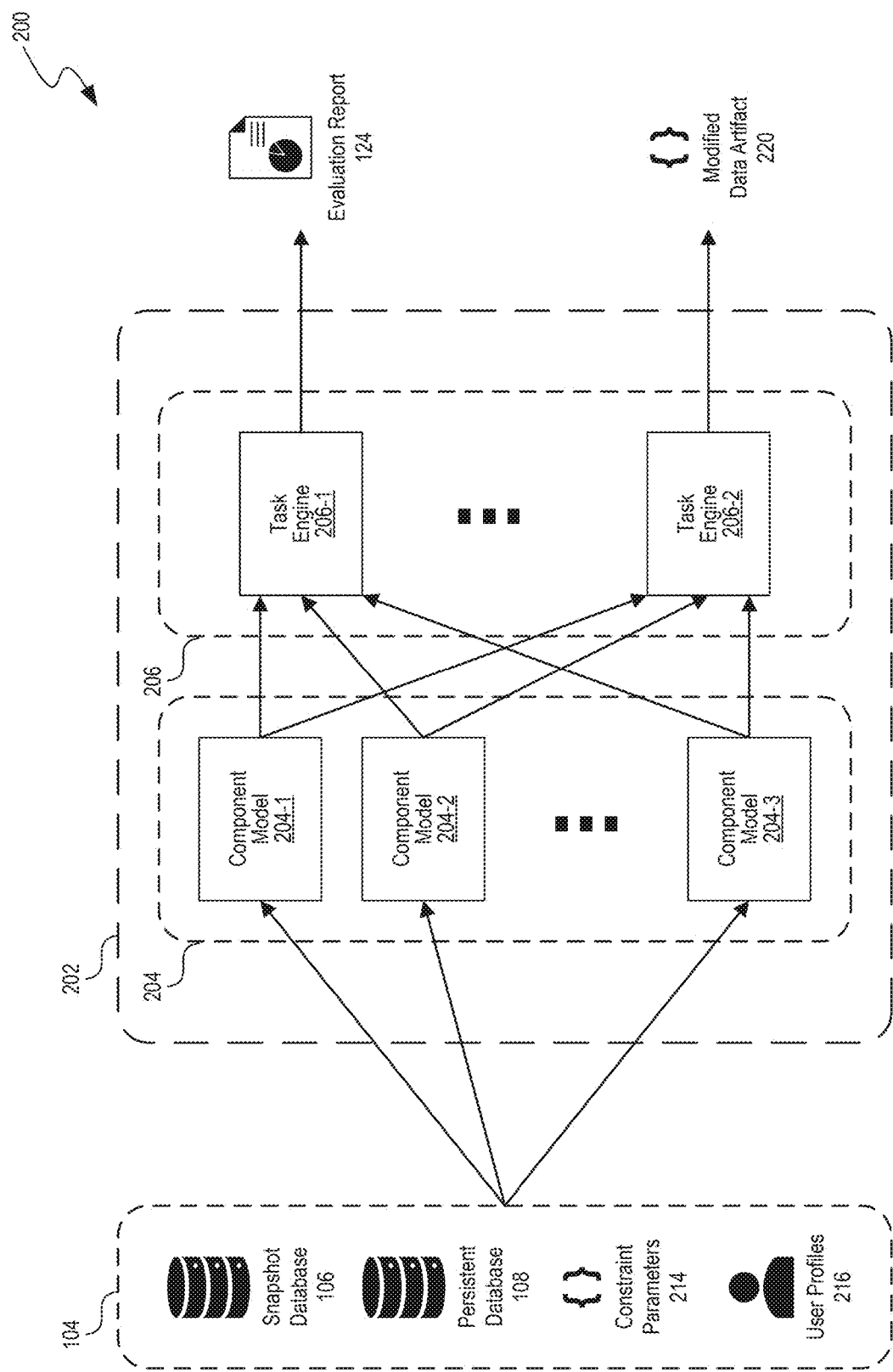
FIG. 2 is a block diagram illustrating a machine learning infrastructure of the unified data management system in accordance with some implementations of the present technology.

FIG. 2 is a block diagram illustrating a machine learning infrastructure 200 ("infrastructure 200") of the unified data management system in accordance with some implementations of the present technology. The infrastructure 200 can comprise a meta-model architecture 202 that is configured to execute one or more operations involving an end user 110 and a unified data framework 104. As an example, the infrastructure 200 is communicatively coupled (e.g., via direct connection, a remote access connection, an API, and/or the like) to the unified data framework 104 to selectively access, modify, and/or store information (e.g., data artifacts 122, constraint parameters 214, user profiles 216) on distinct memory partitions, such as a snapshot database 106 and/or a persistent database 108. The infrastructure 200 is implemented using components of example computing devices 520 and artificial intelligence (AI) system 700 that are illustrated and described in more detail with reference to FIG. 5 and FIG. 7 respectively. Likewise, implementations of example operations can include different and/or additional components or can be connected in different ways.

The infrastructure 200 can communicate with component databases 106, 108 of the unified data framework 104 to access, modify, and/or store data pertaining to user data artifacts 122 originating from a runtime application assembly 120. For example, the infrastructure 200 can connect to the unified data framework 104 to directly access data artifacts 122 that are stored on a persistent database 108 (e.g., a non-volatile memory partition, a long-term storage device, and/or the like). In particular, the data artifacts 122 stored on the persistent database 108 of the unified data framework 104 comprise content elements that are compliant with a current assigned set of constraint parameters 214 (e.g., data usage restrictions). In another example, the infrastructure 200 can connect to the unified data framework 104 to access data artifacts 122 that are stored on a separate snapshot database 106. In particular, the data artifacts 122 stored on the snapshot database 106 of the unified data framework 104 are candidate data artifacts subject to compliance evaluation (e.g., via the infrastructure 200, the logical component 102). In additional or alternative implementations, the snapshot database 106 can be a temporary database (e.g., a volatile memory partition, a short-term storage device, and/or the like) or a separate partition of the persistent database 108.

In some implementations, the infrastructure 200 can connect to the unified data framework 104 to access and/or store constraint parameters 214 used for evaluating compliance of user data artifacts 122. The infrastructure 200 can identify subsets of applicable constraint parameters based on contextual information associated with a data artifact 122. For example, the infrastructure 200 can retrieve (e.g., from the persistent database 108) a subset of constraint parameters that are applicable to data artifacts 122 originating from a specified runtime application of the assembly 120. In another example, the infrastructure 200 can retrieve a subset of constraint parameters that are applicable to data artifacts 122 corresponding to a specific user 110 identity. In additional or alternative implementations, the infrastructure 200 can configure the unified data framework 104 to allocate separate data storage partitions that map to individual constraint parameters 214 for a specified user. As an example, the infrastructure 200 can allocate a first partition of the persistent database 108 to store compliant data artifacts 122 corresponding to a first user and a second partition of the persistent database 108 to store compliant data artifacts 122 corresponding to a second user.

In other implementations, the infrastructure 200 can connect to the unified data framework 104 to access and/or store user profiles 216 for individual users 110 of the runtime application assembly 120. A stored user profile 216 of a user 110 can store identifiable and/or historical information for data artifacts 122 associated with the user 110. For example, the stored user profile 216 can comprise a historical log of prior results (e.g., identified critical data artifacts, non-compliant elements, quantitative risk assessment, and/or the like) for previously evaluated data artifacts 122 corresponding to the user 110. In another example, the stored user profile 216 can comprise trace characteristics (e.g., source application, stored location, timestamp, and/or the like) of prior user data artifacts 122 that enables the infrastructure 200, or the user 110, to locate and/or retrieve the recorded data artifact 122 from the unified data framework 104. In a further example, the stored user profile 216 can comprise an assigned (e.g., via the user 110, an authorized entity, and/or the like) set of constraint parameters 214 to be applied when evaluating data artifacts 122 corresponding to the user 110.

The infrastructure 200 comprises a meta-model architecture 202 (e.g., an ensemble learning structure) that executes one or more operations for evaluating compliance of monitored data artifacts 122 from a runtime application assembly 120. In particular, the meta-model architecture 202 ("meta-model 202") includes component machine learning models 204-1 through 204-3 ("component models 204" or "models 204") and task engines 206-1 through 206-3. The component models 204 and task engines 206 of the meta-model 202 is implemented using example computing devices and machine learning components that are illustrated and described in more detail with reference to FIG. 6 through FIG. 7. Likewise, implementations of example operations can include different and/or additional components or can be connected in different ways.

An individual component model 204 (e.g., a neural network, a natural language model, and/or the like) of the meta-model 202 is configured to accept data artifacts 122 (e.g., data payloads, trace characteristics) and constraint parameters 214 as input features to predict non-compliant content elements of the data artifacts 122 as output features. The meta-model 202 can include a plurality of component models 204 that are each configured to evaluate a specified subset of constraint parameters 214 (e.g., specialized to identify specific non-compliant content elements) for data artifacts 122. As an example, the meta-model 202 can comprise a first component model 204 configured to determine content elements (e.g., an alphanumeric text) of data artifacts 122 that fail to satisfy a ruleset of profanity restrictions (e.g., prohibited terms, inappropriate language, and/or the like) and a second component model 204 configured to determine content elements of the data artifacts 122 that fail to satisfy a ruleset of privileged data restrictions (e.g., identifiable user information). When evaluating compliance of a data artifact 122, the meta-model 202 can invoke the plurality of component models 204 (e.g., in parallel) to obtain separate sets of non-compliant content elements.

An individual task engine 206 of the meta-model 202 is configured to accept the predicted output features (e.g., identified non-compliant content elements) of one or more component models 204 as input stimulus to generate custom evaluation results. As an example, the meta-model 202 can comprise a task engine 206 configured to estimate a content sensitivity score (e.g., quantitative proxy for approximate data management risk) for a data artifact 122 using the identified non-compliant content elements from the component models 204. In another example, the meta-model 202 can further comprise a task engine 206 configured to classify evaluated data artifacts 122 as a critical (e.g., significant non-compliance), or non-critical (e.g., acceptable compliance), data artifacts 122 via comparison of the estimated content sensitivity score to a tolerance threshold. In some implementations, the task engine 206 can be configured to further classify evaluated data artifacts 122 between a plurality of categories that correspond to specified compliance levels (e.g., low risk, medium risk, high risk, and/or the like). In another example, the meta-model 202 can comprise a task engine 206 configured to modify contents of an identified critical data artifact 122 (e.g., censorship, replacement, and/or removal of non-compliant elements) such that the modified data artifact 220 complies with the constraint parameters 214. In other examples, the meta-model 202 can comprise a task engine 206 configured to generate a summarized evaluation report 124 that describes attributes (e.g., trace characteristics, predicted compliance results) of the evaluated data artifact 122, such as a source runtime application, a corresponding user identifier, an authorized user, a timestamp of an action (e.g., artifact generation, user review, and/or the like), a stored location, a content sensitivity score, an accessibility permission, compliance of key performance indicators (KPIs), and/or the like. Accordingly, the meta-model 202 can configure the task engine 206 to transmit the generated evaluation report 124 to notify an end user 110 of critical data artifacts that may require content review.

In some implementations, the meta-model 202 can configure a task engine 206 to use a generative machine learning model (e.g., a large language model) for generating custom evaluation results. For example, the task engine 206 can be configured to prompt a generative machine learning model to determine a correlational mapping between constraint parameters to non-compliant content elements of a data artifact 122. In another example, the task engine 206 can be configured to prompt a generative machine learning model to determine a prior data artifact 122 (e.g., recorded on the persistent database 108) that share similar content elements with identified critical data artifacts for a user 110.

The infrastructure 200 iteratively updates (e.g., supervised training, finetuning) the component models 204 and task engines 206 of the meta-model 202 using monitored user data artifacts 122 from the runtime application assembly 120. As an example, the infrastructure 200 can generate positive training data samples (e.g., ground-truth non-compliant content elements) comprising identified critical user data artifacts 122 and corresponding constraint parameters 214. In another example, the infrastructure 200 can generate negative training data samples (e.g., ground-truth compliant content elements) comprising compliant user data artifacts 122 and corresponding constraint parameters 214. Accordingly, the infrastructure 200 can use a combination of the positive and/or the negative generated training samples to update the component models 204 and task engines 206 of the meta-model 202. In some implementations, the infrastructure 200 can continuously generate training data samples (e.g., content elements of data artifacts 122, constraint parameters 214) for updating the component models 204 using new recorded data artifacts 122 corresponding to real-time user activities. In additional or alternative implementations, the infrastructure 200 can update the meta-model 202 in response to modifications to the constraint parameters 214 (e.g., propagation of new rulesets and/or restrictions). For example, the infrastructure 200 can access (e.g., from the unified data framework 104) a new set of constraint parameters 214 (e.g., assigned by an authorized user) for evaluating user data artifacts 122 monitored from the runtime application assembly 120. Using the new constraint parameters 214, the infrastructure 200 can modify the training data samples (e.g., replace old constraint parameters) used to update the component models 204 and task engines 206 of the meta-model 202. To ensure content compliance of recorded data artifacts 122 stored on the persistent database 108 (e.g., or other partitions of the unified data framework 104), the infrastructure 200 can retroactively evaluate the recorded data artifacts 122 using the new constraint parameters 214. For example, the infrastructure can use the meta-model 202 to iteratively evaluate and identify critical data artifacts 122 from the recorded data artifacts 122.

Figure 3:
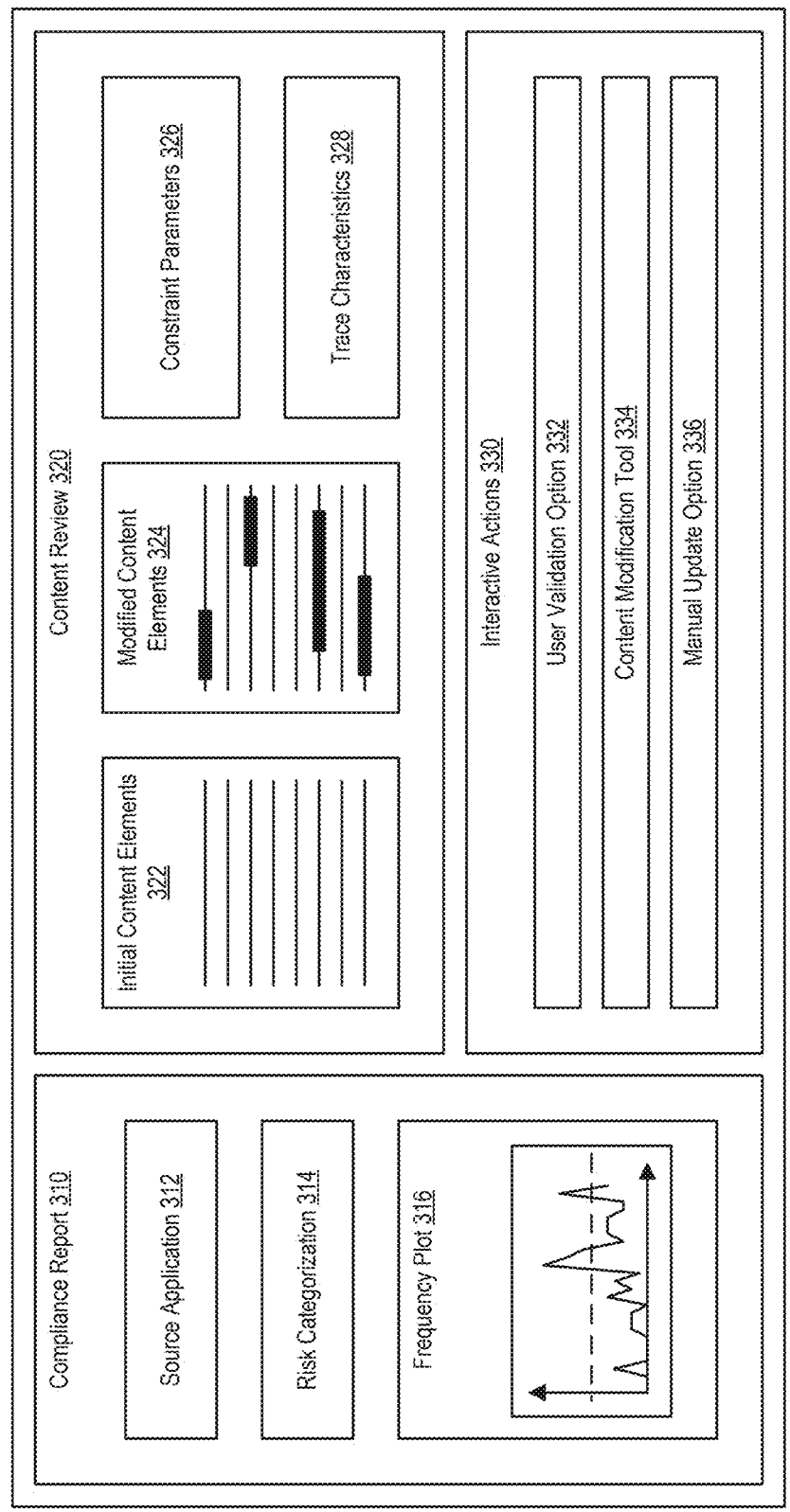
FIG. 3 is a block diagram illustrating an example configuration of an evaluation interface of a unified data management system, in accordance with some implementations of the present technology.

FIG. 3 is a block diagram illustrating an example configuration of an evaluation interface 300 of a unified data management system, in accordance with some implementations of the present technology. The evaluation interface 300 ("interface 300") includes a compliance report component 310, a content review component 320, and an interactive action component 330. The logical component described herein is the same as, or similar to, the logical component 102 illustrated and described in more detail with reference to FIG. 1. Likewise, implementations of example components of the evaluation interface 300 can include different and/or additional components or can be connected in different ways.

The logical component can transmit a notification alert (e.g., an evaluation report 124) that comprises additional instructions (e.g., for the interface 300) to generate and/or display content via interactive graphical user interface (GUI) components. As shown in FIG. 3, the interface 300 can be configured to display a compliance report component 310 that comprises aggregated results for evaluating data artifacts 122 corresponding to a user 110. For example, the compliance report component 310 can comprise a field (e.g., an alphanumeric text, a hierarchical map) indicating a source application 312, or computing service, that generated the data artifact 122. In another example, the compliance report component 310 can comprise an enumerated list (e.g., a scrollable widget) of identified critical data artifacts 122. In further examples, the compliance report component 310 can comprise a risk category 314 that indicates an approximate content sensitivity associated with the identified critical data artifacts 122. In other examples, the compliance report component 310 can comprise a graphical frequency plot 316 that maps a time-series frequency count of identified critical data artifacts 122 within a specified time interval. Accordingly, the interface 300 can plot a visual trend that tracks the local incidence rate for critical data artifacts 122 across individual time increments.

In some implementations, the interface 300 can be configured to display a content review component 320 that comprises details regarding compliance evaluation results for a user data artifact 122. For example, the content review component 320 can display initial content elements 322 (e.g., an alphanumeric text, a visual image, and/or the like) and/or modified content elements 324 (e.g., overlay censorship, content replacement, and/or the like) of the data artifact 122. In another example, the content review component 320 can comprise an enumerated list of unsatisfied constraint parameters 326 for the user data artifact 122. In further examples, the content review component 320 can comprise a field that details trace characteristics 328 of the data artifact 122.

In some implementations, the interface 300 can be configured to display an interactive action component 330 that comprises user selectable elements for triggering one or more corrective actions performed by the unified data management system 100 (e.g., logical component 102). For example, the interactive action component 330 can comprise a validation option 332 that enables users to verify a positive (e.g., or negative) compliance status of a select data artifact 122, which can cause the logical component 102 to generate additional training samples for refining component models 204 and task engines 206 of the meta-model 202 of FIG. 2. In another example, the interactive action component 330 can comprise a content modification tool 334 that enables users to update content elements of a select data artifact 122, which can cause the logical component 102 to perform an additional compliance evaluation based on the modified data artifact 122. In further examples, the interactive action component 330 can comprise a manual update option 336 that enables users to directly request the logical component 102 to update the component models 204 and task engines 206 of the meta-model 202.

Figure 4:
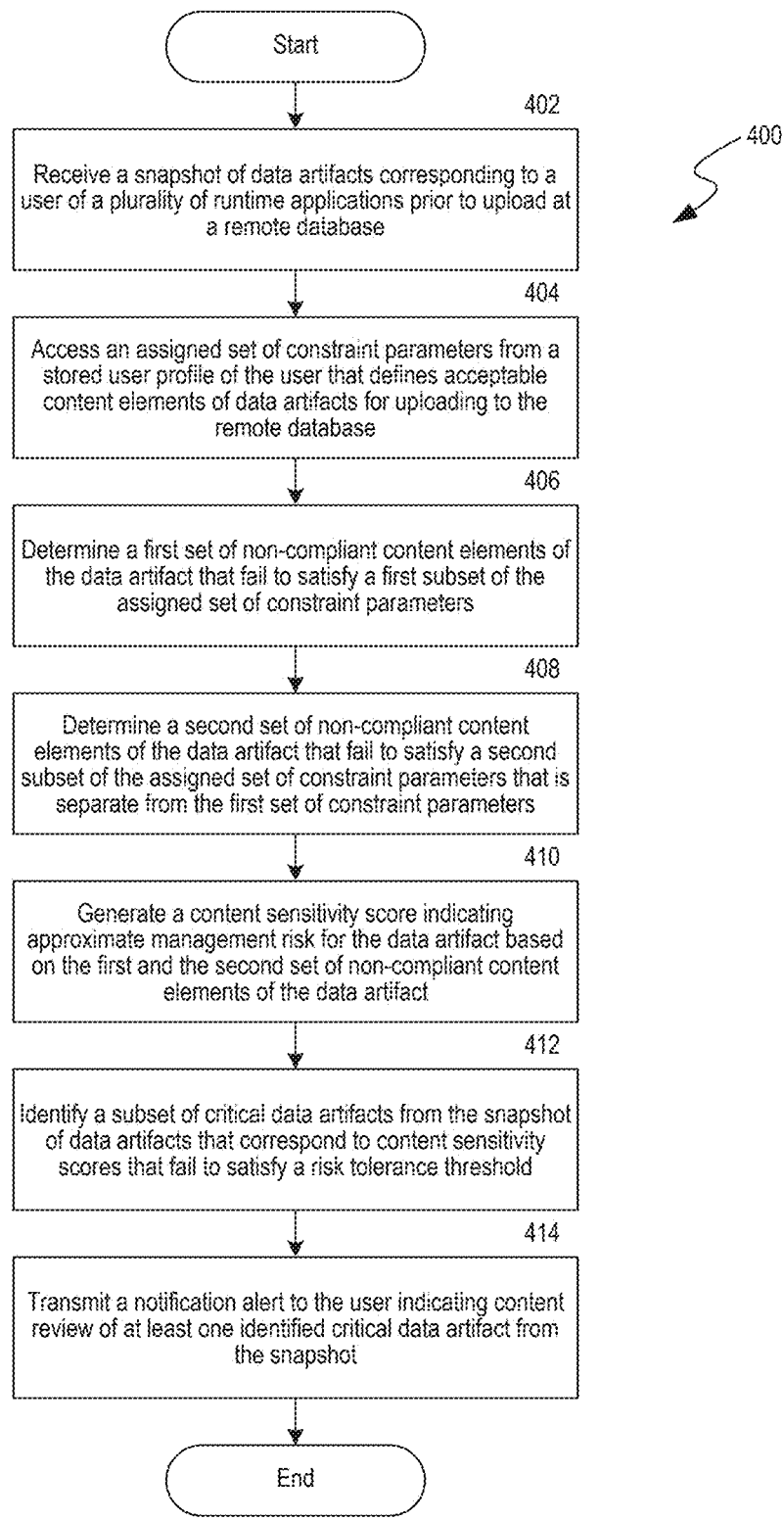
FIG. 4 is a flow diagram that illustrates an example process for managing data artifacts in accordance with some implementations of the disclosed technology.

FIG. 4 is a flow diagram that illustrates an example process 400 for managing data artifacts in accordance with some implementations of the disclosed technology. The process 400 can be performed by a system (e.g., unified data management system 100) configured to identify, and report, non-compliant content elements of user data artifacts originating from a plurality of runtime applications. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

At 402, the system can receive a snapshot of data artifacts (e.g., messages, documents, file uploads, and/or the like) corresponding to a user of a plurality of runtime applications. For example, the system can receive a temporary snapshot (e.g., stored in cache memory) of a first set of data artifacts originating from a first runtime application and a second set of data artifacts originating from a second runtime application that is separate from the first runtime application. In some implementations, the system can receive the snapshot of data artifacts prior to upload of the data artifacts at a remote database. In other implementations, the snapshot of data artifacts corresponding to the user can comprise an alphanumeric text, a document file, an image, a video, an audio signal, an activity log, an embedded reference to external data, a source code, a persistent memory state, a data communication request, or a combination thereof.

At 404, the system can access an assigned set of constraint parameters (e.g., data usage restrictions, information compliance requirements, and/or the like) that defines acceptable content elements of data artifacts for uploading to the remote database. For example, the system can extract the set of constraint parameters from a stored user profile corresponding to the user of the runtime applications. In some implementations, the set of constraint parameters can comprise an identifiable user information, a prohibited content type, a user specified content restriction, a data usage restriction, a third-party regulatory restriction, or a combination thereof.

The system can determine non-compliant content elements of each artifact (e.g., from the snapshot of data artifacts) that fail to satisfy the set of constraint parameters. For example, at 406, the system can determine a first set of non-compliant content elements of each data artifact (e.g., from the snapshot of data artifacts) that fail to satisfy a first subset of the assigned set of constraint parameters. In another example, at 408, the system can determine a second set of non-compliant content elements of each data artifact (e.g., from the snapshot of data artifacts) that fail to satisfy a second subset of the assigned set of constraint parameters that is separate from the first set of constraint parameters.

In some implementations, the system can receive a selected set of constraint parameters for assignment to the user. For example, the system can receive (e.g., from an authorized user interface) a selected set of constraint parameters that are not present in the assigned set of constraint parameters. Accordingly, the system can determine a third set of non-compliant content elements of the data artifact that fail to satisfy the selected set of constraint parameters. In additional or alternative implementations, the system can identify (e.g., from the remote database) a set of uploaded data artifacts corresponding to the user such that each uploaded data artifact originates from the plurality of runtime applications. Accordingly, the system can determine a set of non-compliant content elements of the uploaded data artifact that fail to satisfy the selected set of constraint parameters.

At 410, the system can generate a content sensitivity score indicating approximate management risk for each data artifact (e.g., from the snapshot of data artifacts) based on the first and the second set of non-compliant content elements of the data artifact. For example, the system can invoke a machine learning model (e.g., a neural network, a generative machine learning model, and/or the like) to estimate a quantitative risk assessment score based on the first and the second identified sets of non-compliant elements for each data artifact. In some implementations, the system can prompt a generative machine learning model (e.g., a large language model) to determine a correlational mapping (e.g., relative significance weights) between elements of the set of constraint parameters to the first and the second set of non-compliant content elements of the data artifact.

In some implementations, the system can use a machine learning model that is configured as a meta-model (e.g., a composition of multiple component models) for generating the content sensitivity score. For example, the system can invoke a first machine learning model of the meta-model to determine the first set of non-compliant content elements of the data artifact such that the first machine learning model is trained on a first training data that indicates content elements of data artifacts that fail to satisfy the first subset of the assigned set of constraint parameters. The system can further invoke a second machine learning model of the meta-model (e.g., separate from the first machine learning model) to determine the second set of non-compliant content elements of the data artifact such that the second machine learning model is trained on a second training data that indicates content elements of data artifacts that fail to satisfy the second subset of the assigned set of constraint parameters.

In some implementations, the system can use the machine learning model to generate a second content sensitivity score indicating approximate management risk for each data artifact (e.g., from the snapshot of data artifacts) based, at least in part, on the third set of non-compliant content elements of the data artifact. In other implementations, the system can use the machine learning model to generate a second content sensitivity score indicating approximate management risk for each uploaded data artifact (e.g., from the identified set of uploaded data artifacts) based on the set of non-compliant content elements of the uploaded data artifact.

At 412, the system can identify a set of critical data artifacts (e.g., from the snapshot of data artifacts) corresponding to content sensitivity scores that fail to satisfy a risk tolerance threshold. In some implementations, the system can identify (e.g., from the snapshot of data artifacts) a second set of critical data artifacts corresponding to second content sensitivity scores that fail to satisfy the risk tolerance threshold. In other implementations, the system can identify (e.g., from the set of uploaded data artifacts) a subset of critical uploaded data artifacts corresponding to second content sensitivity scores that fail to satisfy the risk tolerance threshold.

In some implementations, the system can identify (e.g., from the remote database) a set of uploaded data artifacts corresponding to the user such that each uploaded data artifact originates from the plurality of runtime applications. Accordingly, the system can prompt a generative machine learning model to determine a subset of uploaded data artifacts that share similar content elements with data artifacts from the identified set of critical data artifacts. In additional or alternative implementations, the system can prompt a generative machine learning model to determine a subset of uploaded data artifacts that share similar content elements with data artifacts from the identified set of critical data artifacts.

In some implementations, the system can receive the snapshot of data artifacts corresponding to the user based on a periodic update frequency. Using the content sensitivity scores of data artifacts from the snapshot, the system can dynamically adjust the periodic update frequency. For example, the system can access (e.g., from the stored user profile) previous content sensitivity scores that correspond to a set of prior critical data artifacts identified for the user. By comparing the content sensitivity scores and the previous content sensitivity scores, the system can determine a sensitivity divergence score representative of deviations in management risk between the set of critical data artifacts and the set of prior critical data artifacts. In response to the sensitivity divergence score failing to satisfy an equilibrium threshold, the system can dynamically adjust the periodic update frequency by a correction factor proportional to the sensitivity divergence score.

At 414, the system can transmit a notification alert to the user indicating content review of at least one identified critical data artifact from the snapshot. In some implementations, the system can configure the notification alert to display a user interactive element (e.g., at a user interface) that enables the user to modify non-compliant content elements of the at least one critical data artifact. In some implementations, the system can configure the notification alert to further display (e.g., at the user interactive element, a visible user interface, and/or the like) a set of trace characteristics corresponding to the at least one identified critical data artifact. For example, the system can configure the notification alert to display identifiable information associated with the critical data artifact, a stored location, an application of origin, a computing environment, a participant user, an authorized user, an accessibility documentation, compliance of key performance metrics (KPIs), and/or a combination thereof.

In some implementations, the system can further configure operations and/or functions of the notification alert prior to transmission to the user. For example, the system can determine displayed contents of a visual interface component (e.g., at a user interface) that corresponds to the at least one identified critical data artifact. Accordingly, the system can configure the notification alert (e.g., prior to transmission) to censor at least a portion of the displayed contents of the visual interface component. In another example, the system can configure (e.g., prior to transmission) the notification alert to indicate content review of at least one uploaded data artifact from the determined subset of uploaded data artifacts, at least one second identified critical data artifact from the second set of critical data artifacts, at least one identified critical uploaded data artifact from the subset of critical uploaded data artifacts, and/or a combination thereof.

In some implementations, the system can automatically perform one or more corrective actions (e.g., data processing, model updating, and/or the like) in response to user activity (e.g., from a user interface). As an illustrative example, identify a set of non-compliant content elements for at least one modified critical data artifact received from the user. In particular, the system can use the first and the second set of non-compliant content elements of the at least one critical data artifact to identify the set of non-compliant content elements of th at least one user modified critical data artifact. In a further example, the system can update the at least one modified critical data artifact to replace the identified set of non-compliant content elements with a set of placeholder content elements (e.g., a symbolic link, a template variable, a censored article, and/or the like) such that each placeholder content element comprises a stored mapping (e.g., at an isolated and/or secure database) to an identified non-compliant content element. Accordingly, the system can upload the at least one modified critical data artifact (e.g., with placeholder content elements) to the remote database. In another example, the system can receive (e.g., from the user interactive element) at least one user modified content element of the at least one critical data artifact that complies with the set of constraint parameters. Accordingly, the system can update the machine learning model via a training sample comprising the at least one user modified content element and a positive compliance label. In an alternative example, the system can update the machine learning model via a training sample comprising the content elements of the at least one critical data artifact and a positive compliance label in response to a user verified compliance status of content elements of the at least one critical data artifact.

Example Computing Environment

Figure 5:
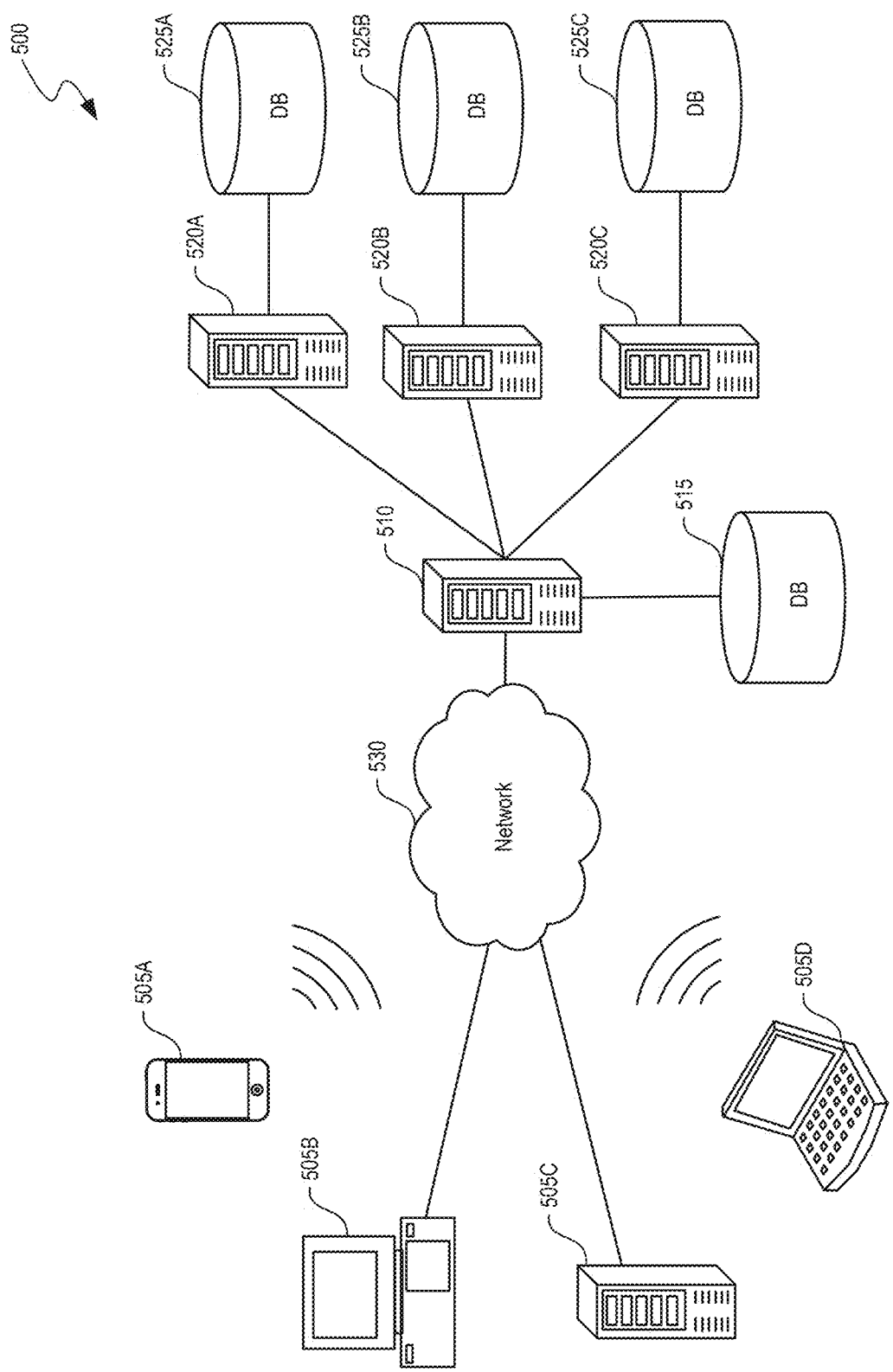
FIG. 5 is a system diagram illustrating an example of a computing environment in which the disclosed system operates in some implementations.

FIG. 5 is a system diagram illustrating an example of a computing environment in which the disclosed system operates in some implementations. In some implementations, environment 500 includes one or more client computing devices 505A-D, examples of which can host the unifie data management system 100 of FIG. 1. Client computing devices 505 operate in a networked environment using logical connections through network 530 to one or more remote computers, such as a server computing device.

In some implementations, server 510 is an edge server which receives client requests and coordinates fulfillment of those requests through other servers, such as servers 520A-C. In some implementations, server computing devices 510 and 520 comprise computing systems, such as the unified data management system 100 of FIG. 1. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server or client devices. In some implementations, servers (510, 520A-C) connect to a corresponding database (515, 525A-C). As discussed above, each server 520 can correspond to a group of servers, and each of these servers can share a database or can have its own database. Databases 515 and 525 warehouse (e.g., store) information such as claims data, email data, call transcripts, call logs, policy data and so on. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. In some implementations, network 530 is the Internet or some other public or private network. Client computing devices 505 are connected to network 530 through a network interface, such as by wired or wireless communication. While the connections between server 510 and servers 520 are shown as separate connections, these connections can be any kind of local, wide area, wired, or wireless network, including network 530 or a separate public or private network.

Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 6:
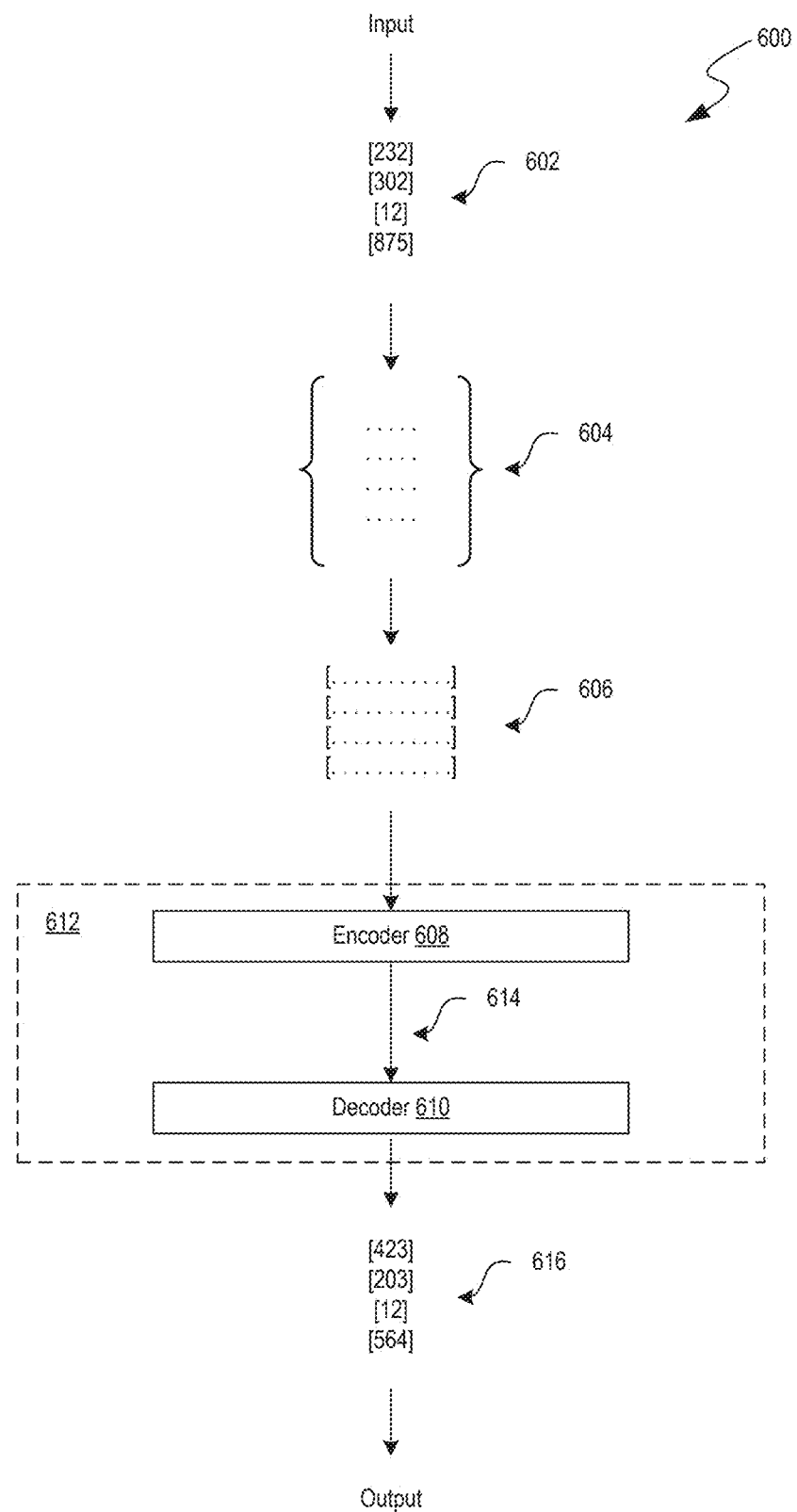
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector 606 (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture 600 for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 7:
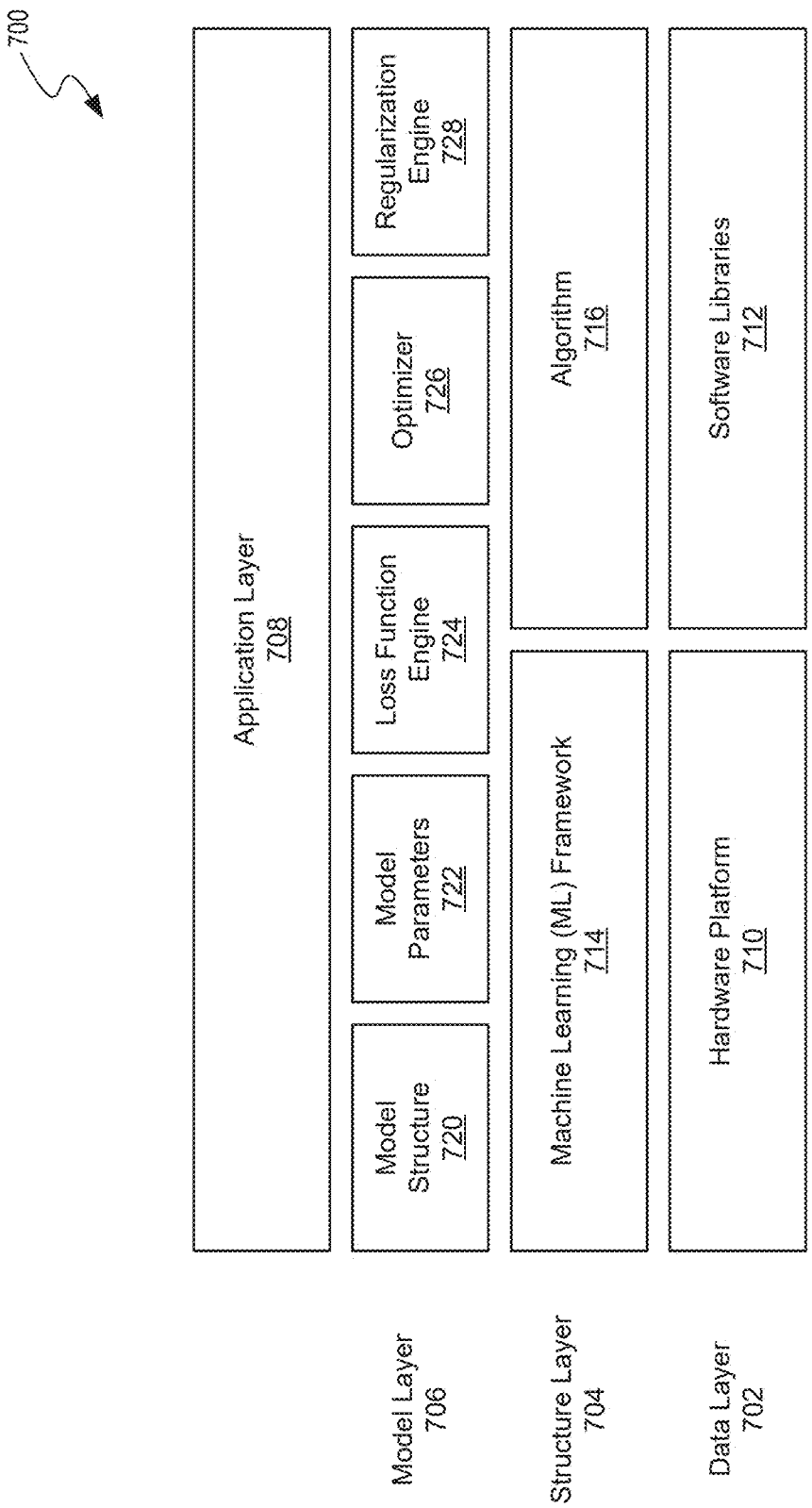
FIG. 7 illustrates a layered architecture of an artificial intelligence (AI) system that can implement the ML models of the data management system in accordance with some implementations of the present technology.

FIG. 7 illustrates a layered architecture of an artificial intelligence (AI) system 700 that can implement the ML models of the unified data management system 100 of FIG. 1, in accordance with some implementations of the present technology. Example ML models can include the models executed by the machine learning infrastructure 200. Accordingly, the machine learning infrastructure 200 can include one or more components of the AI system 700.

As shown, the AI system 700 can include a set of layers, which conceptually organize elements within an example network topology for the AI system's architecture to implement a particular AI model. Generally, an AI model is a computer-executable program implemented by the AI system 700 that analyses data to make predictions. Information can pass through each layer of the AI system 700 to generate outputs for the AI model. The layers can include a data layer 702, a structure layer 704, a model layer 706, and an application layer 708. The algorithm 716 of the structure layer 704 and the model structure 720 and model parameters 722 of the model layer 706 together form an example AI model. The optimizer 726, loss function engine 724, and regularization engine 728 work to refine and optimize the AI model, and the data layer 702 provides resources and support for application of the AI model by the application layer 708.

The data layer 702 acts as the foundation of the AI system 700 by preparing data for the AI model. As shown, the data layer 702 can include two sub-layers: a hardware platform 710 and one or more software libraries 712. The hardware platform 710 can be designed to perform operations for the AI model and include computing resources for storage, memory, logic and networking, such as the resources described in relation to FIGS. 4 and 6. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include computing resources, (e.g., servers, memory, etc.) offered by a cloud services provider. The hardware platform 710 can also include computer memory for storing data about the AI model, application of the AI model, and training data for the AI model. The computer memory can be a form of random-access memory (RAM), such as dynamic RAM, static RAM, and non-volatile RAM.

The software libraries 712 can be thought of suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include INTEL Math Kernel Library, NVIDIA cuDNN, EIGEN, and OpenBLAS.

The structure layer 704 can include an ML framework 714 and an algorithm 716. The ML framework 714 can be thought of as an interface, library, or tool that allows users to build and deploy the AI model. The ML framework 714 can include an open-source library, an application programming interface (API), a gradient-boosting library, an ensemble method, and/or a deep learning toolkit that work with the layers of the AI system facilitate development of the AI model. For example, the ML framework 714 can distribute processes for application or training of the AI model across multiple resources in the hardware platform 710. The ML framework 714 can also include a set of pre-built components that have the functionality to implement and train the AI model and allow users to use pre-built functions and classes to construct and train the AI model. Thus, the ML framework 714 can be used to facilitate data engineering, development, hyperparameter tuning, testing, and training for the AI model. Examples of ML frameworks 714 that can be used in the AI system 700 include TENSORFLOW, PYTORCH, SCIKIT-LEARN, KERAS, LightGBM, RANDOM FOREST, and AMAZON WEB SERVICES.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model through being trained while running computing resources of the hardware platform 710. This training allows the algorithm 716 to make predictions or decisions without being explicitly programmed to do so. Once trained, the algorithm 716 can run at the computing resources as part of the AI model to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. Furthermore, training data can include pre-processed data generated by various engines of the unified data management system 100 described in relation to FIG. 1. The user may label the training data based on one or more classes and trains the AI model by inputting the training data to the algorithm 716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model of the AI system 700. The model structure 720 defines the complexity of the pattern/relationship that the AI model expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's performance during training. For instance, the loss function engine 724 can measure the difference between a predicted output of the AI model and the actual output of the AI model and is used to guide optimization of the AI model during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 702.

The regularization engine 728 executes regularization operations. Regularization is a technique that prevents over- and under-fitting of the AI model. Overfitting occurs when the algorithm 716 is overly complex and too adapted to the training data, which can result in poor performance of the AI model. Underfitting occurs when the algorithm 716 is unable to recognize even basic patterns from the training data such that it cannot perform well on training data or on validation data. The optimizer 726 can apply one or more regularization techniques to fit the algorithm 716 to the training data properly, which helps constrain the resulting AI model and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 can be communicatively coupled (e.g., display application data, receive user input, and/or the like) to an interactable user interface of the unified data management system 100 of FIG. 1.

Computer System

Figure 8:
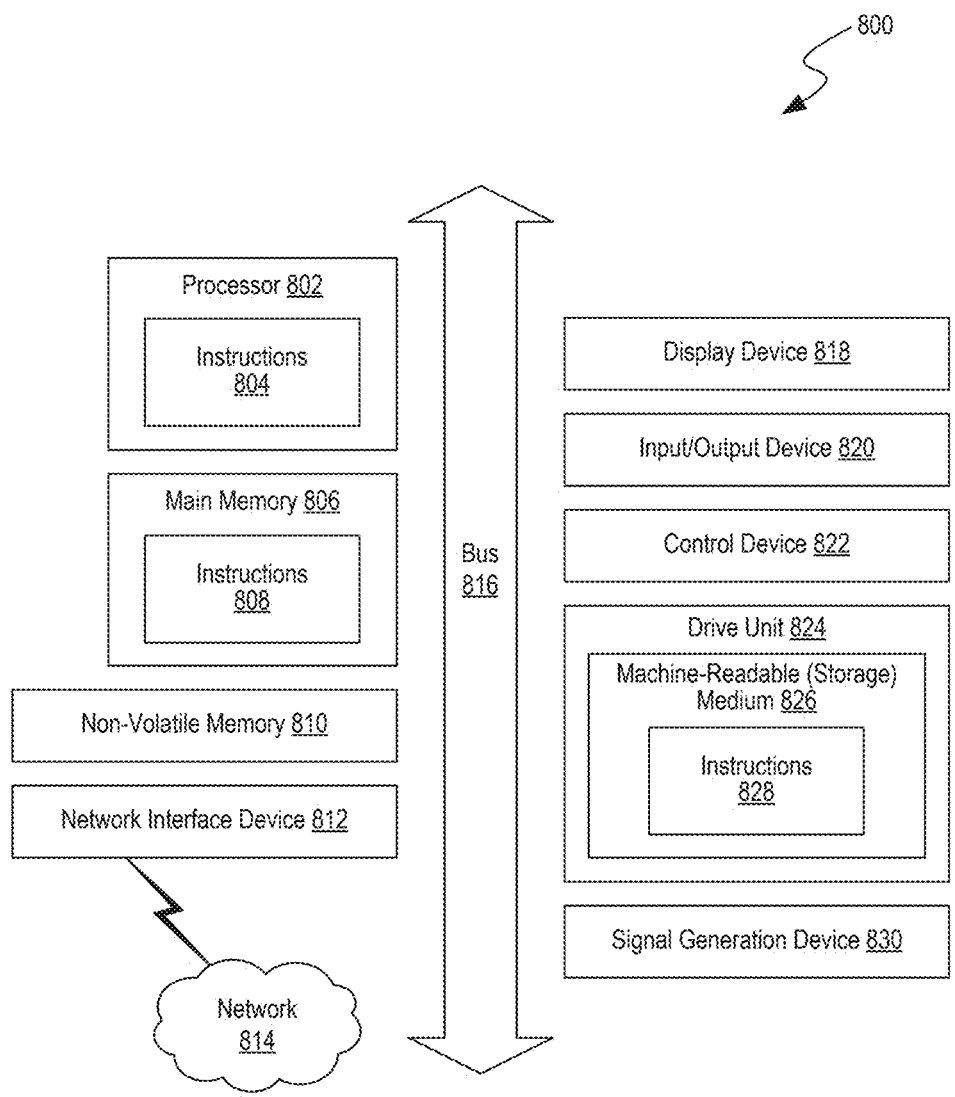
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

FURTHER EXAMPLES

A computer-implemented method performed by a unified data management system can include receiving, prior to upload at a remote database, a snapshot of data artifacts corresponding to a user of a plurality of runtime applications, the snapshot of data artifacts including: (1) a first set of data artifacts originating from a first runtime application, and (2) a second set of data artifacts originating from a second runtime application that is separate (e.g., or different) from the first runtime application. The method can include accessing, from a stored user profile of the user, an assigned set of constraint parameters that defines acceptable content elements of data artifacts for uploading to the remote database. The method can include for each data artifact from the snapshot of data artifacts: determining a first set of non-compliant content elements of the data artifact that fail to satisfy a first subset of the assigned set of constraint parameters, determining a second set of non-compliant content elements of the data artifact that fail to satisfy a second subset of the assigned set of constraint parameters that is separate from the first set of constraint parameters, and generating, using a machine learning model, a content sensitivity score indicating approximate management risk for the data artifact based on the first and the second set of non-compliant content elements of the data artifact. The method can include identifying, from the snapshot of data artifacts, a set of critical data artifacts corresponding to content sensitivity scores that fail to satisfy a risk tolerance threshold. The method can include transmitting a notification alert to the user indicating content review of at least one identified critical data artifact from the snapshot, wherein the notification alert is configured to display a user interactive element that enables the user to modify non-compliant content elements of the at least one critical data artifact.

In some implementations, the method can include receiving, from an authorized user interface, a selected set of constraint parameters for assignment to the user, the selected set including constraint parameters that are not present in the assigned set of constraint parameters. The method can include for each data artifact from the snapshot of data artifacts: determining a third set of non-compliant content elements of the data artifact that fail to satisfy the selected set of constraint parameters, and generating, using the machine learning model, a second content sensitivity score indicating approximate management risk for the data artifact based, at least in part, on the third set of non-compliant content elements of the data artifact. The method can include identifying, from the snapshot of data artifacts, a second set of critical data artifacts corresponding to second content sensitivity scores that fail to satisfy the risk tolerance threshold. The method can include configuring, prior to transmission, the notification alert to indicate content review of at least one second identified critical data artifact from the second set of critical data artifacts.

In some implementations, the method can include receiving, from an authorized user interface, a selected set of constraint parameters for assignment to the user, the selected set including constraint parameters that are not present in the assigned set of constraint parameters. The method can include identifying, from the remote database, a set of uploaded data artifacts corresponding to the user, each uploaded data artifact originating from the plurality of runtime applications. The method can include for each uploaded data artifact from the set of uploaded data artifacts: determining a set of non-compliant content elements of the uploaded data artifact that fail to satisfy the selected set of constraint parameters, generating, using the machine learning model, a second content sensitivity score indicating approximate management risk for the uploaded data artifact based on the set of non-compliant content elements of the uploaded data artifact. The method can include identifying, from the set of uploaded data artifacts, a subset of critical uploaded data artifacts corresponding to second content sensitivity scores that fail to satisfy the risk tolerance threshold. The method can include configuring, prior to transmission, the notification alert to indicate content review of at least one identified critical uploaded data artifact from the subset of critical uploaded data artifacts.

In some implementations, the method can include identifying, from the remote database, a set of uploaded data artifacts corresponding to the user, each uploaded data artifact originating from the plurality of runtime applications. The method can include prompting a generative machine learning model to determine a subset of uploaded data artifacts that share similar content elements with data artifacts from the identified set of critical data artifacts. The method can include configuring, prior to transmission, the notification alert to indicate content review of at least one uploaded data artifact from the determined subset of uploaded data artifacts.

In some implementations, the at least one identified critical data artifact can correspond to displayed contents of a visual interface component. The method can include configuring, prior to transmission, the notification alert to censor at least a portion of the displayed contents of the visual interface component.

In some implementations, the snapshot of data artifacts corresponding to the user can be received based on a periodic update frequency. The method can include accessing, from the stored user profile, previous content sensitivity scores that correspond to a set of prior critical data artifacts identified for the user. The method can include determining, via comparison of the content sensitivity scores and the previous content sensitivity scores, a sensitivity divergence score representative of deviations in management risk between the set of critical data artifacts and the set of prior critical data artifacts. The method can include responsive to the sensitivity divergence score failing to satisfy an equilibrium threshold, dynamically adjusting the periodic update frequency by a correction factor proportional to the sensitivity divergence score.

In some implementations, the notification alert can be further configured to display, at the user interactive element, a set of trace characteristics corresponding to the at least one identified critical data artifact, the set of trace characteristics including a stored location, an application of origin, a computing environment, a participant user, an authorized user, an accessibility documentation, compliance of key performance metrics (KPIs), or a combination thereof.

In some implementations, the machine learning model used to generate the content sensitivity score for the data artifact can be a meta-model. The method can include invoking a first machine learning model of the meta-model to determine the first set of non-compliant content elements of the data artifact, wherein the first machine learning model is trained on a first training data that indicates content elements of data artifacts that fail to satisfy the first subset of the assigned set of constraint parameters. The method can include invoking a second machine learning model of the meta-model to determine the second set of non-compliant content elements of the data artifact, wherein the second machine learning model is trained on a second training data that indicates content elements of data artifacts that fail to satisfy the second subset of the assigned set of constraint parameters.

In some implementations, the method can include prompting a generative machine learning model to determine a correlational mapping between elements of the set of constraint parameters to the first and the second set of non-compliant content elements of the data artifact.

In some implementations, the method can include receiving, from the user interactive element, at least one user modified content element of the at least one critical data artifact that complies with the set of constraint parameters. The method can include updating the machine learning model via a training sample including the at least one user modified content element and a positive compliance label.

In some implementations, the method can include responsive to a user verified compliance status of content elements of the at least one critical data artifact, updating the machine learning model via a training sample including the content elements of the at least one critical data artifact and a positive compliance label.

In some implementations, the snapshot of data artifacts corresponding to the user can include an alphanumeric text, a document file, an image, a video, an audio signal, an activity log, an embedded reference to external data, a source code, a persistent memory state, a data communication request, or a combination thereof.

In some implementations, the set of constraint parameters can include an identifiable user information, a prohibited content type, a user specified content restriction, a data usage restriction, a third-party regulatory restriction, or a combination thereof.

We claim:

1. A method performed by a unified data management system, the method comprising:
   receiving, prior to an upload to a unified database storing compliant data artifacts associated with a plurality of runtime applications, a snapshot of external data artifacts corresponding to a user of the plurality of runtime applications, the snapshot of external data artifacts comprising:
   (1) a first set of external data artifacts originating from a first external database of a first runtime application, and
   (2) a second set of external data artifacts originating from a second external database of a second runtime application that is different from the first runtime application, the second external database separate from the first external database;
   accessing, from a stored user profile of the user, an assigned set of constraint parameters associated with an identity of the user that defines acceptable content elements of data artifacts for uploading to the unified database for the plurality of runtime applications;
   for each data artifact from the snapshot of external data artifacts:
      inputting the data artifact and a first subset of the assigned set of constraint parameters into a first machine learning model to determine a first set of non-compliant content elements of the data artifact that fail to satisfy the first subset of the assigned set of constraint parameters,
      inputting the data artifact and a second subset of the assigned set of constraint parameters that is different from the first subset of constraint parameters into a second machine learning model to determine a second set of non-compliant content elements of the data artifact that fail to satisfy the second subset of the assigned set of constraint parameters, and
      generating, using a second machine learning model, a content sensitivity score indicating approximate management risk for the data artifact based on the first and the second set of non-compliant content elements of the data artifact;

identifying, from the snapshot of external data artifacts, a set of critical data artifacts, each critical data artifact of the set of critical data artifacts corresponding to a respective content sensitivity score that fails to satisfy a risk tolerance threshold;

transmitting a notification alert to the user indicating content review of at least one identified critical data artifact from the snapshot of external data artifacts, wherein the notification alert is configured to cause display of a user interactive element that enables the user to modify non-compliant content elements of the at least identified one critical data artifact;

responsive to receiving, from the user, at least one modified critical data artifact comprising verified content elements:

causing automatic update of the first machine learning model using at least one training sample comprising the verified content elements of the at least one modified critical data artifact, inputting the at least one modified critical data artifact, the first subset of the assigned set of constraint parameters, and the second subset of the assigned set of constraint parameters into the updated first machine learning model to determine a set of non-compliant content elements of the at least one modified critical data artifact, wherein the set of non-compliant content elements are stored at a memory cache separate from the unified database for the plurality of runtime applications, and updating the at least one modified critical data artifact to replace the identified set of non-compliant content elements stored at the memory cache with a set of placeholder content elements, each placeholder content element of the set of placeholder content elements comprising a stored mapping to an identified non-compliant content element of the set of non-compliant content elements, and uploading the at least one updated modified critical data artifact comprising the set of placeholder elements to the unified database separate from the memory cache storing the set of non-compliant content elements; and responsive to a user verified compliance status of content elements of the at least one identified critical data artifact, causing the machine learning model to be updated using a training sample comprising the content elements of the at least one critical data artifact and a positive compliance label.

2. The method of claim 1 further comprising:

receiving, from an authorized user interface, a selected set of constraint parameters for assignment to the user, the selected set comprising constraint parameters that are not present in the assigned set of constraint parameters;

for each data artifact from the snapshot of data artifacts:

determining a third set of non-compliant content elements of the data artifact that fail to satisfy the selected set of constraint parameters, and generating, using the machine learning model, a second content sensitivity score indicating approximate management risk for the data artifact based, at least in part, on the third set of non-compliant content elements of the data artifact;

identifying, from the snapshot of data artifacts, a second set of critical data artifacts, each of the critical data artifacts corresponding to a respective second content sensitivity score that fails to satisfy the risk tolerance threshold; and configuring, prior to transmission, the notification alert to indicate content review of at least one second identified critical data artifact from the second set of critical data artifacts.

3. The method of claim 1 further comprising:

receiving, from an authorized user interface, a selected set of constraint parameters for assignment to the user, the selected set comprising constraint parameters that are not present in the assigned set of constraint parameters;

identifying, from the unified database, a set of uploaded data artifacts corresponding to the user, each uploaded data artifact of the set of uploaded data artifacts originating from the plurality of runtime applications;

for each uploaded data artifact from the set of uploaded data artifacts:

determining a set of non-compliant content elements of the uploaded data artifact that fail to satisfy the selected set of constraint parameters, and generating, using the machine learning model, a second content sensitivity score indicating approximate management risk for the uploaded data artifact based on the set of non-compliant content elements of the uploaded data artifact;

identifying, from the set of uploaded data artifacts, a subset of critical uploaded data artifacts corresponding to second content sensitivity scores that fail to satisfy the risk tolerance threshold; and configuring, prior to transmission, the notification alert to indicate content review of at least one identified critical uploaded data artifact from the subset of critical uploaded data artifacts.

4. The method of claim 1 further comprising:

identifying, from the unified database, a set of uploaded data artifacts corresponding to the user, each uploaded data artifact originating from the plurality of runtime applications;

prompting a generative machine learning model to determine a subset of uploaded data artifacts that share similar content elements with data artifacts from the identified set of critical data artifacts; and configuring, prior to transmission, the notification alert to indicate content review of at least one uploaded data artifact from the determined subset of uploaded data artifacts.

5. The method of claim 1, wherein the at least one identified critical data artifact corresponds to displayed contents of a visual interface component, and wherein the method further comprises:

configuring, prior to transmission, the notification alert to censor at least a portion of the displayed contents of the visual interface component that is associated with the determined non-compliant content elements of the at least one identified critical data artifact.

6. The method of claim 1, wherein the snapshot of data artifacts corresponding to the user is received based on a periodic update frequency, and wherein the method further comprises:

accessing, from the unified database, previous content sensitivity scores that correspond to a set of prior critical data artifacts identified for the user;

determining, via comparison of the content sensitivity scores and the previous content sensitivity scores, a sensitivity divergence score representative of deviations in management risk between the set of critical data artifacts and the set of prior critical data artifacts; and responsive to the sensitivity divergence score failing to satisfy an equilibrium threshold, dynamically adjusting the periodic update frequency by a correction factor proportional to the sensitivity divergence score.

7. The method of claim 1, wherein the notification alert is further configured to display, at the user interactive element, a set of trace characteristics corresponding to the at least one identified critical data artifact, the set of trace characteristics comprising a stored location, an application of origin, a computing environment, a participant user, an authorized user, an accessibility documentation, compliance of key performance metrics (KPIs), or a combination thereof.

8. The method of claim 1, wherein the machine learning model used to generate the content sensitivity score for the data artifact is a meta-model, and wherein the method further comprises:

invoking a first machine learning model of the meta-model to determine the first set of non-compliant content elements of the data artifact,
wherein the first machine learning model is trained on first training data that indicates content elements of data artifacts that fail to satisfy the first subset of the assigned set of constraint parameters; and invoking a second machine learning model of the meta-model to determine the second set of non-compliant content elements of the data artifact,
wherein the second machine learning model is trained on second training data that indicates content elements of data artifacts that fail to satisfy the second subset of the assigned set of constraint parameters.

9. The method of claim 1 further comprising:

prompting a generative machine learning model to determine a correlational mapping between elements of the set of constraint parameters to the first and the second set of non-compliant content elements of the data artifact.

10. The method of claim 1, wherein the snapshot of data artifacts corresponding to the user comprises structured and unstructured data, alphanumeric text, a document file, an image, a video, an audio signal, an activity log, an embedded reference to external data, a source code, a persistent memory state, a data communication request, or a combination thereof.

11. The method of claim 1, wherein the set of constraint parameters comprises identifiable user information, a prohibited content type, a user-specified content restriction, a data usage restriction, a third-party regulatory restriction, or a combination thereof.

12. A non-transitory, computer-readable storage medium comprising instructions recorded thereon, wherein the instructions when executed by at least one data processor of a system, cause the system to:

receive, prior to an upload to a unified database storing compliant data artifacts associated with a plurality of runtime applications, a snapshot of external data artifacts corresponding to a user of the plurality of runtime applications, the snapshot of external data artifacts comprising:

(1) a first set of external data artifacts originating from a first external database of a first runtime application, and (2) a second set of external data artifacts originating from a second external database of a second runtime application that is different from the first runtime application, the second external database separate from the first external database;

access, from a stored user profile of the user, an assigned set of constraint parameters associated with an identity of the user that defines acceptable content elements of data artifacts for uploading to the unified database for the plurality of runtime applications;

for each data artifact from the snapshot of data artifacts:
determine a first set of non-compliant content elements of the data artifact that fail to satisfy a first subset of the assigned set of constraint parameters,
determine a second set of non-compliant content elements of the data artifact that fail to satisfy a second subset of the assigned set of constraint parameters that is different from the first subset of constraint parameters, and
generate, using a machine learning model, a content sensitivity score indicating approximate management risk for the data artifact based on the first and the second set of non-compliant content elements of the data artifact;

identify, from the snapshot of external data artifacts, a set of critical data artifacts, each critical data artifact of the set of critical data artifacts corresponding to a respective content sensitivity score that fails to satisfy a risk tolerance threshold;

display, at a user interface associated with the user, at least one identified critical data artifact from the snapshot of external data artifacts and a user interactive element enabling the user to modify non-compliant content elements of the at least one identified critical data artifact; and responsive to receiving, from the user, at least one modified critical data artifact, determine a set of non-compliant content elements of the at least one modified critical data artifact, the set of non-compliant content elements failing to satisfy the first subset of the assigned set of constraint parameters and the second subset of the assigned set of constraint parameters;

update the at least one modified critical data artifact to replace the identified set of non-compliant content elements with a set of placeholder content elements, each placeholder content element of the set of placeholder content elements comprising a stored mapping to an identified non-compliant content element of the set of non-compliant content elements;

display, at the user interface, the at least one updated modified critical data artifact comprising the set of placeholder elements,
wherein the set of placeholder content elements censors at least a portion of the displayed contents corresponding to the identified set of non-compliant content elements; and responsive to a user verified compliance status of content elements of the at least one identified critical data artifact, cause the machine learning model to be updated using a training sample comprising the content elements of the at least one critical data artifact and a positive compliance label.

13. The non-transitory, computer-readable storage medium of claim 12, wherein the machine learning model used to generate the content sensitivity score for the data artifact is a meta-model, and wherein the instructions further cause the system to:

invoke a first machine learning model of the meta-model to determine the first set of non-compliant content elements of the data artifact, wherein the first machine learning model is trained on first training data that indicates content elements of data artifacts that fail to satisfy the first subset of the assigned set of constraint parameters; and invoke a second machine learning model of the meta-model to determine the second set of non-compliant content elements of the data artifact, wherein the second machine learning model is trained on second training data that indicates content elements of data artifacts that fail to satisfy the second subset of the assigned set of constraint parameters.

14. The non-transitory, computer-readable storage medium of claim 12, wherein the instructions further cause the system to:

prompt a generative machine learning model to determine a correlational mapping between elements of the set of constraint parameters to the first and the second set of non-compliant content elements of the data artifact.

15. The non-transitory, computer-readable storage medium of claim 12, wherein the instructions further cause the system to:

receive, from the user interactive element, at least one user-modified content element of the at least one critical data artifact that complies with the set of constraint parameters; and update the machine learning model via a training sample comprising the at least one user-modified content element and a positive compliance label.

16. A system comprising:

at least one hardware processor; and at least one non-transitory memory storing instructions, which, when executed by the at least one hardware processor, cause the system to:

receive, prior to an upload to a unified database storing compliant data artifacts associated with a plurality of runtime applications, a snapshot of external data artifacts corresponding to a user of the plurality of runtime applications, the snapshot of external data artifacts comprising:

(1) a first set of external data artifacts originating from a first external database of a first runtime application, and (2) a second set of external data artifacts originating from a second external database of a second runtime application that is different from the first runtime application, the second external database separate from the first external database;

access, from a stored user profile of the user, an assigned set of constraint parameters associated with an identity of the user that defines acceptable content elements of data artifacts for uploading to the unified database for the plurality of runtime applications;

for each data artifact from the snapshot of data artifacts:

determine a first set of non-compliant content elements of the data artifact that fail to satisfy a first subset of the assigned set of constraint parameters, determine a second set of non-compliant content elements of the data artifact that fail to satisfy a second subset of the assigned set of constraint parameters that is different from the first subset of constraint parameters, and generate, using a machine learning model, a content sensitivity score indicating approximate management risk for the data artifact based on the first and the second set of non-compliant content elements of the data artifact;

identify, from the snapshot of external data artifacts, a set of critical data artifacts, each critical data artifact of the set of critical data artifacts corresponding to a respective content sensitivity score that fails to satisfy a risk tolerance threshold; and display, at a user interface associated with the user, at least one identified critical data artifact from the snapshot of external data artifacts and a user interactive element enabling the user to modify non-compliant content elements of the at least one identified critical data artifact; and responsive to receiving, from the user, at least one modified critical data artifact, determine a set of non-compliant content elements of the at least one modified critical data artifact, the set of non-compliant content elements failing to satisfy the first subset of the assigned set of constraint parameters and the second subset of the assigned set of constraint parameters;

update the at least one modified critical data artifact to replace the identified set of non-compliant content elements with a set of placeholder content elements, each placeholder content element of the set of placeholder content elements comprising a stored mapping to an identified non-compliant content element of the set of non-compliant content elements;

display, at the user interface, the at least one updated modified critical data artifact comprising the set of placeholder elements, wherein the set of placeholder content elements censors at least a portion of the displayed contents corresponding to the identified set of non-compliant content elements; and responsive to a user verified compliance status of content elements of the at least one identified critical data artifact, cause the machine learning model to be updated using a training sample comprising the content elements of the at least one critical data artifact and a positive compliance label.

17. The system of claim 16, wherein the machine learning model used to generate the content sensitivity score for the data artifact is a meta-model, and wherein the system is further caused to:

invoke a first machine learning model of the meta-model to determine the first set of non-compliant content elements of the data artifact, wherein the first machine learning model is trained on first training data that indicates content elements of data artifacts that fail to satisfy the first subset of the assigned set of constraint parameters; and invoke a second machine learning model of the meta-model to determine the second set of non-compliant content elements of the data artifact, wherein the second machine learning model is trained on second training data that indicates content elements of data artifacts that fail to satisfy the second subset of the assigned set of constraint parameters.

18. The system of claim 16 further caused to:

receive, from the user interactive element, at least one user-modified content element of the at least one critical data artifact that complies with the set of constraint parameters; and update the machine learning model via a training sample comprising the at least one user-modified content element and a positive compliance label.

19. The system of claim 16 further caused to:
identify, from the unified database, a set of uploaded data artifacts corresponding to the user, each uploaded data artifact originating from the plurality of runtime applications;
prompt a generative machine learning model to determine a subset of uploaded data artifacts that share similar content elements with data artifacts from the identified set of critical data artifacts; and
transmit a notification alert to indicate content review of at least one uploaded data artifact from the determined subset of uploaded data artifacts.

20. The system of claim 16, wherein the snapshot of data artifacts corresponding to the user is received based on a periodic update frequency, and wherein the system is further caused to:
access, from the unified database, previous content sensitivity scores that correspond to a set of prior critical data artifacts identified for the user;
determine, via comparison of the content sensitivity scores and the previous content sensitivity scores, a sensitivity divergence score representative of deviations in management risk between the set of critical data artifacts and the set of prior critical data artifacts; and
responsive to the sensitivity divergence score failing to satisfy an equilibrium threshold, dynamically adjust the periodic update frequency by a correction factor proportional to the sensitivity divergence score.

\* \* \* \* \*